(12) United States Patent  
Potlapally et al.

(10) Patent No.: US 9,251,384 B1  
(45) Date of Patent: Feb. 2, 2016

(54) TRUSTED PERIPHERAL DEVICE FOR A HOST IN A SHARED ELECTRONIC ENVIRONMENT

(71) Applicant: Amazon Technologies, Inc., Reno, NV (US)

(72) Inventors: Nachiketh Rao Potlapally, Arlintgon, VA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 392 days.

(21) Appl. No.: 13/788,306

(22) Filed: Mar. 7, 2013

(51) Int. Cl.  
*H04L 29/00* (2006.01)  
*G06F 21/85* (2013.01)

(52) U.S. Cl.  
CPC ...................................... *G06F 21/85* (2013.01)

(58) Field of Classification Search  
CPC ................................... H04L 9/32; H04L 9/00

USPC ............................................. 705/44; 713/170  
See application file for complete search history.

(56) References Cited

U.S. PATENT DOCUMENTS 8,572,382 B2 * 10/2013 De Lutiis et al. ............. 713/170  
2012/0095919 A1 * 4/2012 Hart et al. ....................... 705/44

* cited by examiner

*Primary Examiner* — Brandon Hoffman  
*Assistant Examiner* — Michael D Anderson  
(74) *Attorney, Agent, or Firm* — Hogan Lovells US LLP

(57) ABSTRACT

A trusted peripheral device can be utilized with an electronic resource, such as a host machine, in order to enable the secured performance of security and remote management in the electronic environment, where various users might be provisioned on, or otherwise have access to, the electronic resource. The peripheral can have a secure channel for communicating with a centralized management system or service, whereby the management service can remotely connect to this trusted peripheral, using a secure and authenticated network connection, in order to run the above-described functionality on the host to which the peripheral is attached.

23 Claims, 5 Drawing Sheets

TRUSTED PERIPHERAL DEVICE FOR A HOST IN A SHARED ELECTRONIC ENVIRONMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In some cases, users may want special hardware or full access to specific resources. Such access comes with risks for providers of those resources, however, as in a cloud or other shared environment there typically will be various users accessing those resources at various times. Once an outside entity has access to such a resource, the entity can potentially compromise the resource and/or software on the resource in any of a number of ways. In an environment where a management service provides instructions to a resource regarding security and management functionality, which are typically implemented by different components of the resource, the entity can potentially gain access to these instructions and/or components in order to modify and/or control the security and management functions of the resource.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing functionality in an electronic environment. In particular, approaches in accordance with various embodiments take advantage of the overlap between security and remote management functionality to implement both in a single piece of hardware. In at least some embodiments, a trusted peripheral card (e.g., a network interface card or "NIC") or dongle device can be used to perform security and remote management functionality for a host machine in a multi-tenant, shared resource, or "cloud" environment, for example. An authorized host in a management or "control" plane can remotely connect to this trusted peripheral, using a secure and authenticated network connection, in order to run these and/or other functions on the host to which the peripheral is attached. The security functions can include privileged functions such as platform measurement, measurement attestation, and credential security management, while the remote management functions can include functions such as reading host memory locations, performing boot measurements, managing hardware registers, collecting statistics from a connected host, reading sensors, and the like. Such a peripheral can have a dedicated processor, or other independent controller, running a trusted operating system kernel. The operating system can be used to implement the above-mentioned manageability and security functions. For added security, the security functions can be run at a higher privilege level, or in a higher privilege mode, as may be based on privilege modes in the underlying processor. The peripheral can also have at least one out-of-band (OOB) networking stack such that the card can be reached even when the host processor is powered down or otherwise unavailable. The overall system thus can be designed to allow the trusted peripheral to perform various privileged operations. Such functionality helps to reduce the operational burden of managing resources such as cloud hosts, and saves cost which can be passed on to customers.

Various other combinations and variations are also presented in accordance with the embodiments described and suggested herein.

Figure 1:
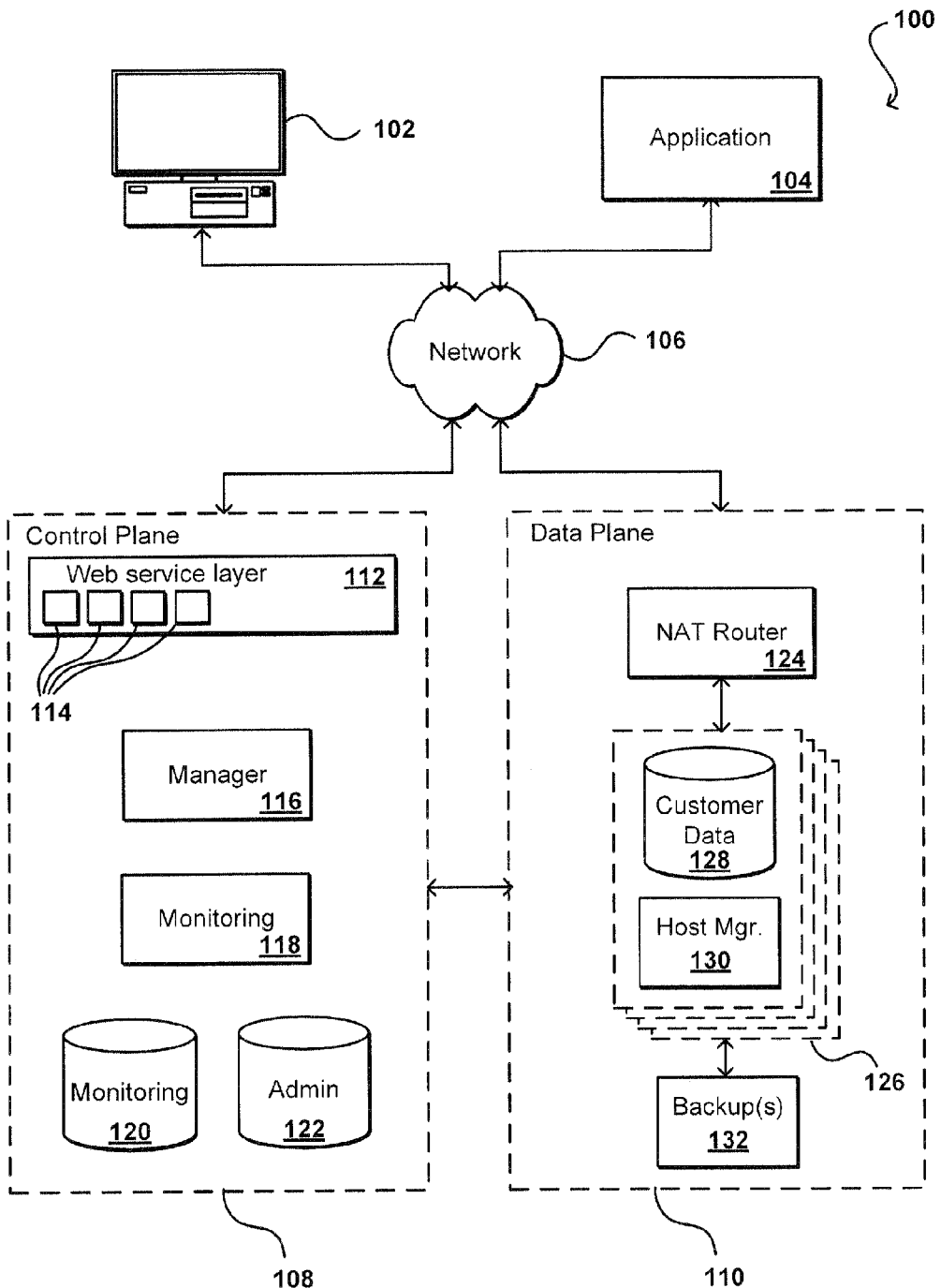
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. In this example, a computing device 102 for an end user is shown to be able to make calls across at least one network 106 to a control plane 108 (or other such access layer) to perform a task such as to obtain access to a specified resource or resource type. The computing device 102 can include any appropriate device known or used for such purposes, as may include client devices such as personal computers, cell phones, handheld messaging devices, laptop computers, set-top boxes, personal data assistants, electronic book readers, and the like. The at least one network can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. While an end user computing device 102 and an application 104 are used for purposes of explanation, it should be understood that any appropriate user, application, service, device, component, or resource can access the interface(s) and components of the control plane and/or data plane as appropriate in the various embodiments. Further, while certain components are grouped into a data "plane" or data "environment," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions. The control plane also can include a set of APIs 114 (or other such interfaces) for receiving Web services calls or other such requests from across the network 106, which a Web services layer 112 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects.

The control plane 108 can include one or more resource managers 116, each responsible for tasks such as validating the user or client associated with the request and obtaining or allocating access to the appropriate resource(s). Such a system can handle various types of requests and can establish various types of connections. Such a system also can handle requests for various types of resources, such as specific graphic processors or other types of hardware or hardware functionality, and can provide access to the appropriate resource(s). Components of the data plane 110, or the resource layer of the cloud, can perform the necessary tasks to provide the resource. Once the resource is provided and/or available for access by the computing device 102, the user can be provided with the DNS address and a port address to be used to access a resource. A user then can access the resource directly in the data plane 110 using the DNS address and port, without having to access or go through the control plane 108.

The control plane 108 in this embodiment also includes at least one monitoring component 118. When a resource is allocated, created, or otherwise made available in the data plane, information for the resource can be written to a data store accessible to the control plane, such as a monitoring data store 120. It should be understood that the monitoring data store can be a separate data store or a portion of another data store. A monitoring component 118 can access the information in the monitoring data store 120 to determine information such as the past usage of resources by various users, a current number or type of threads or resources being allocated to a user, and other such usage information. A monitoring component also can call into components of the data plane 110 to determine information such as the number of active connections for a given user in the data environment and aspects about the usage of each connection. A monitoring component 118 can constantly monitor the usage of each resource by a user, client, etc., having an allocation provided through the connection manager. A monitoring component also can access information stored in an administrative ("Admin") or similar data store 122, which can store information such as the general allocation granted to a user, throttling or limiting information for a user, resource permissions for a user, or any other such information that can be specified and/or updated by an administrator or other such user.

In an example where users request connections to various resources, such as physical or virtual host machines 134, each machine 134 in the data environment can include at least one data store 128 or other type of resident memory or storage, and a host manager component 128. A host manager in one embodiment is an application or software agent executing on a machine, such as a Tomcat or Java application server, programmed to manage tasks such as software deployment and data store operations, as well as monitoring a state of the respective resource. The resource manager 116 can communicate periodically with each host manager 130 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of) the data plane 110 through the network in order to directly interact with that resource 126. In various embodiments, as discussed, the data plane takes the form of (or at least includes or is part of) a computing cloud environment, or a set of Web services and resources that provides data storage and access across a "cloud" or dynamic network of hardware and/or software components. A IP address derived from DNS mappings is beneficial in such a dynamic cloud environment, as instance or availability failures, for example, can be masked by programmatically remapping the IP address to any appropriate replacement instance for a use. A request received from a user 102 or application 104, for example, can be directed to a network address translation (NAT) router 124, or other appropriate component, which can direct the request to the actual resource 126 or host corresponding to the mapped address of the request. Such an approach allows for resources to be dynamically moved, updated, replicated, etc., without requiring the user or application to change the IP address or other address used to access the instance. In some cases, a resource 126 such as a data instance can have at least one backup instance 132 or copy in persistent storage.

Figure 2:
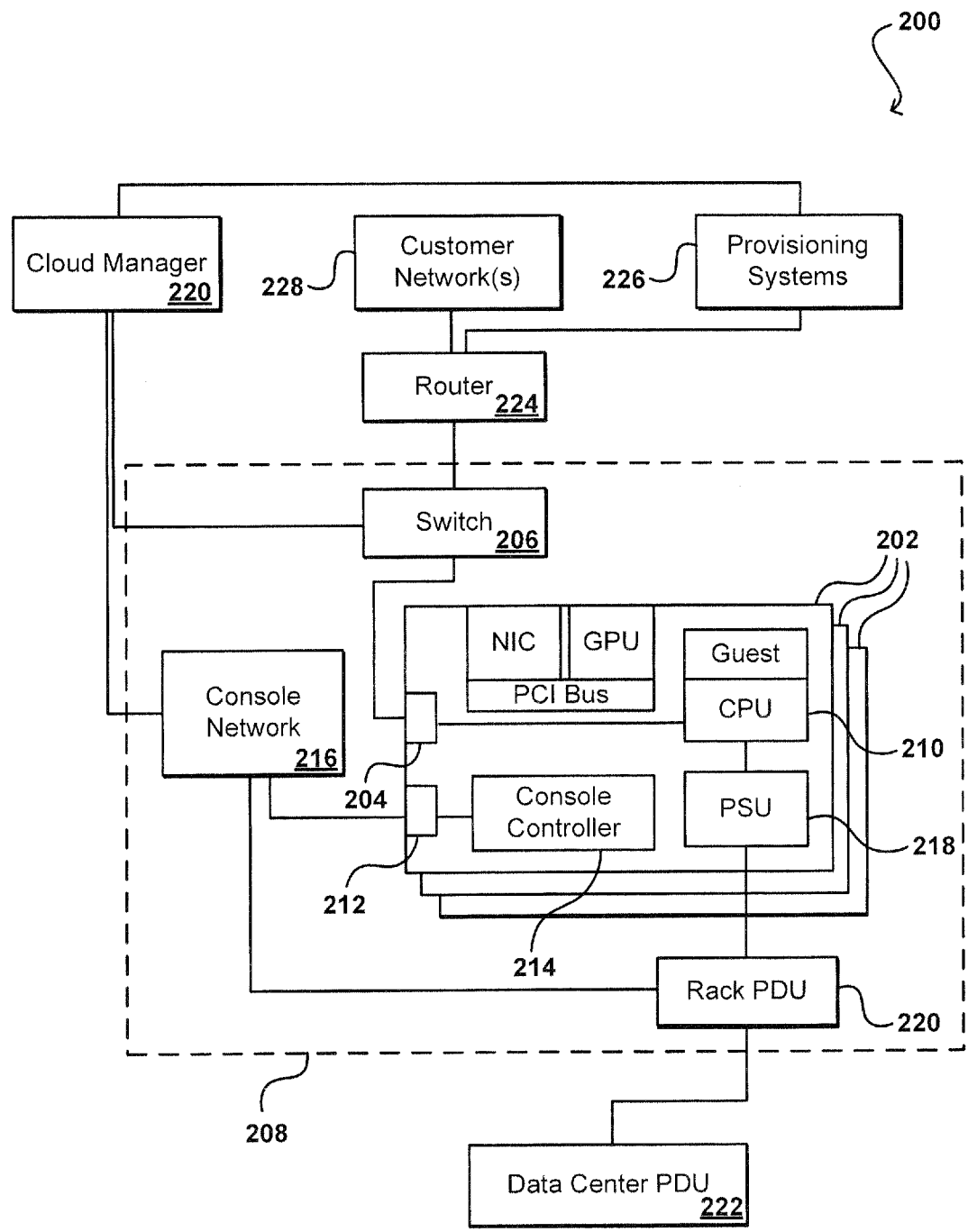
FIG. 2 illustrates an environment for providing access to various resources that can be used in accordance with one embodiment.

FIG. 2 illustrates an example of a configuration 200 that can be used to provide a user with access to a hardware resource for at least an appropriate period of time. This example will be discussed with respect to conventional PCI-based technology, but it should be understood that this is merely an example and that approaches within the scope of the various embodiments can be used with any appropriate hardware (including based on different bus technologies or with greater or lesser degrees of system integration within individual components or "chips"), software, and protocols currently used or subsequently developed for such purposes.

This example configuration 200 includes a set of host devices 202, such as servers or similar devices, that each can have a series of network ports 204. Some of these ports can function as "production" ports which connect each host to at least one network switch 206 capable of processing and routing network traffic to/from each device. In some embodiments the network switch can be a "smart" network switch, while in other embodiments segregation can happen at a higher level in the network than the first tier of switches. In a data center example, there might be one smart switch for each rack of servers 208, for example. At least one of these network ports 204 can host network traffic for a guest operating system, where the guest is effectively operating "on top of" at least one central processing unit (CPU) 210 in the allocated or provisioned host device (e.g., server) 202 that has access to this production network port. The host device 202 also can have at least one console port 212 and a console controller 214, which can connect to a separate console network 216. This "console network" also can be implemented using the same network technology as the "production network," such as Ethernet technology. In some embodiments, at least some of these ports can be merged but logically separated (e.g., multiplexed on the same physical port). Each host device also can have one or more dedicated power supply units (PSUs) 218, which can be accessed by the console controller and/or the main CPU, whereby the machine can be powered off via either the host 2PU or a device on the network, for example. The power supply for every server in a rack can be connected to a rack power distribution unit (PDU) 220, which can be connected by a higher power cable to one or more data center PDUs 222, each of which can support multiple rack PDUs. In some cases, the hosts 202 can be powered on and off by running a line to the console controller from the rack PDU with relays or other such components to power cycle each device.

At least one router 224 can connect the host devices to one or more provisioning systems 226, and the switch and/or router can manage access to these provisioning systems. In some embodiments, network traffic within a rack is aggregated in order to minimize the number of cables leaving each rack. Once provisioning is completed, authorized customer networks 228 can interact with the devices 202 via the switch 206. The provisioning and control systems can control the switch in real time with no humans involved, as the automatic switching of that path can be based on provisioning events and external coordination, for example. The coordination can be provided and/or managed by an external system, such as a cloud manager database and system 330, or other such control plane or control system as discussed elsewhere herein, which can instruct the provisioning system(s) 226, console network 216, and rack components to perform certain actions. The cloud manager 230 can include one or more workflow systems that work with a central database, in one embodiment, to perform various aspects of resource management.

When providing guest access in such an environment, there can be various challenges relating to security and management. As discussed, once a customer has access to a host the customer (or a related entity) can potentially compromise the device and/or software on the device in any of a number of ways. If the customer can access the PCI bus on a host, for example, the customer can potentially access all devices connected to that bus.

Figure 3:
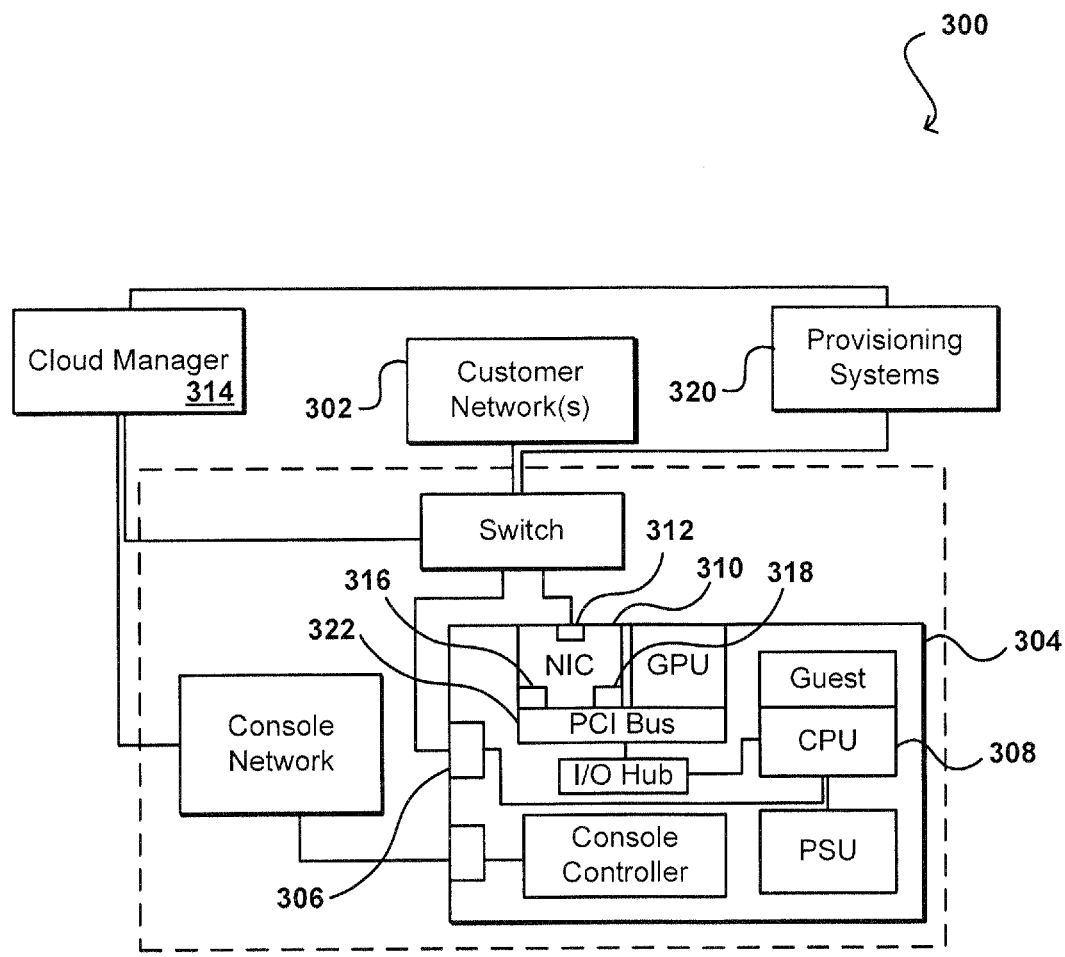
FIG. 3 illustrates a configuration for securely providing security and management functionality from a host that can be used in accordance with one embodiment.

Approaches in accordance with various embodiments can provide security and management functionality for a resource that is inaccessible to one or more customers provisioned on, or otherwise having access to, that resource. FIG. 3 illustrates an example 300 of one such approach that can be utilized in accordance with various embodiments. In this example, a peripheral card or NIC 310 has a device or component body with at least one connector for connecting the peripheral to a PCI bus (or other appropriate component) of the host device 304. While the NIC can communicate with components of the device such as the CPU 308, the NIC also has a separate port and/or channel 312 that is separate from the communications channel 306 for the customer network 302. It should be understood that while a NIC is used for purposes of explanation, various appropriate peripheral devices can be used within the scope of the various embodiments. In this example, the separate channel 312 can be a secure and authenticated network connection, which can be accessed by an authorized component, such as a cloud manager 314 or provisioning manager 320, in at least some embodiments.

In this example, certain peripheral devices such as network interface cards (NICs) 310 can be trusted devices that have at least one separate network communications port that is not exposed to a guest user of the hardware. A network interface thus can be programmed, configured, and/or manufactured to only enable access to specific local information or functionality, such as by utilizing a dedicated network port as an "out-of-band" network port. This port can be dedicated for access by a control network, for example, such that a guest user can be denied access to the port, and might not even be able to view or detect the port as part of the configuration. Using such an approach, security and management functionality and/or instructions can be restricted to information received over a port and/or path that is not exposed to guest users. In some embodiments updates can be received through a console port of the machine, allowing a remote console to manage the configuration of the device, although any other appropriate port can be used where the information can be directed to the appropriate component, and where access by the user can be controlled or restricted. Various other network interfaces can be used that are not exposed to, or accessible by, a user, processor, or guest OS of a host machine or hardware device.

In this example, the peripheral card has a dedicated processor 316 and a trusted operating system kernel 318, which enables the processor to operate as an independent controller on a trusted peripheral device. The independent controller can be tasked with a variety of security and management functions, which can vary in different embodiments. The controller can communicate over the trusted channel 312 with a centralized management component, such as a cloud manager 314, which can send commands to perform actions on the host machine 304. The NIC 310 in this example then can be the trusted arbiter for these commands from the cloud manager 314, and can cause actions to be performed on the host as necessary to implement the actions, obtain the desired information, or perform other such actions.

In at least some embodiments, the trusted operating system on the peripheral device maintains at least two privileged modes of operation. These modes can include a mode for executing remote manageability functions and a mode for executing security functionality. This isolation can be maintained at the process level, for example, such as by using ring-based privilege separation. In another example, the modes can be running as virtual machines on a virtual machine manager-based kernel, among other such options. Authorization information or other such information can be required for accessing the security mode of operation, which includes the ability to issue function calls and access associated registers and memory. As mentioned, the peripheral can have an out-of-band (OOB) networking stack, based on a LAN, serial console, or dongle, for example, such that the peripheral can be reached even when the host processor is powered down. The OOB networking stack can ensure that the host processor cannot intercept any of the peripheral networking traffic. The peripheral can access all of the host memory in at least some embodiments, having read/write DMA access in at least some embodiments, and can use specially coded bus cycles, such as peripheral component interconnect express ("PCIe") or other high-speed, serial computer expansion bus cycles, which can prevent any malicious peripheral from spoofing its traffic. This special encoding (e.g., special PCI encoding) can also allow control traffic, or other types of traffic discussed herein, from the peripheral to be granted higher priority, such as on the PCI bus. The peripheral can have secure non-volatile storage for storing cryptographic keys used for confidentiality and authenticating purposes. In a security bootstrapping process, for example, the security of firmware and software running on the peripheral can be verified using a trusted host in the cloud. In some embodiments, the peripheral has the ability to access PCI cycles sent to an address range, such as a TPM address range (i.e., 0xfed40000-0xfed4ffff).

In one example, an authorized host or service such as the cloud manager 314 can connect to the NIC over the secure and authenticated network connection in order to perform any of a variety of management functions. These can include, for example, reading host memory locations, reading from (and writing to) various hardware registers in the CPU and chipset, reading various sensors on the platform, performing power and thermal management (i.e., through voltage scaling, initiating power transitions through configuration register changes, etc.), performing hardware integrity checks on the various peripherals (e.g., disks, flash memory, etc.), and applying software, microcode, and/or firmware patches to the platform, which can include the CPU, chipset and other processors in at least some embodiments. The peripheral in some embodiments can issue system management interrupts (SMIs) in order to run various management routines (e.g., SMM routines) on the host processor. These manageability operations can be performed even when the host processor 308 is powered off. The peripheral can also monitor various hardware sensors (e.g., thermal sensors or power sensors) on the platform. The peripheral then can transmit information from the monitoring, such that any action needing to be performed based on these values can be actuated through the peripheral.

The trusted peripheral can also be configured to perform any of a variety of security functionality in addition to the management functionality. For example, the peripheral can receive instructions from the cloud manager to perform tasks that might typically be performed by a trusted platform module (TPM), as may include platform management, passing boot measurement to the cloud host, attesting the platform measurement to a remote trusted cloud host, securely sealing platform secrets (i.e., securely storing keys needed by applications running on the host), and security forensics. As part of platform measurement, the peripheral can measure and record all the software (e.g., virtual machine manager, drivers, OS) and firmware (e.g., BIOS, PCI Option ROM code) running on the platform, including values in security sensitive hardware registers. Such a comprehensive measurement can capture the complete state of the platform, providing an in-depth recording of security of the platform. The platform measurement can be stored in a secure local storage which cannot be accessed from the host processor, and will not be impacted by, for example, warm platform resets or CPU-only resets. The trusted peripheral can re-compute measurements during run-time operation to detect any security attacks on the BIOS, virtual machine manager, etc. The trusted peripheral in at least some embodiments has an embedded secret key that can be used to perform trusted attestation of host platform measurements to a remote host (or other such entity or component). As part of sealed storage, the trusted peripheral can bind platform secrets to the platform measurement such that the secrets can only be unsealed when the same (or another designated) platform state is established. When the host needs to decrypt some information, the host in at least some embodiments can offload the entire encrypted item onto this peripheral device with the dedicated processor, which can use the secure keys or other secrets to decrypt and send the content back to the host in a form that the host can access and utilize. For security forensics, the peripheral can snapshot memory contents and sent the snapshot securely to a remote host, which can be very valuable for tasks such as investigating and/or remediating potential malware infections or malicious customer actions.

In some embodiments, a dedicated peripheral can function more like a "dongle," or a device that attaches to the host (i.e., via a PCI or other such bus) to provide secured functionality. Rather than having a dedicated OOB connection, such a device can instead utilize a single connection that multiplexes a secure management channel with the data channel that ultimately gets forwarded to the host. Functionality such as packet filtering can be provided for the single connection device. The peripheral thus can provide gate-keeper type functionality to the physical host via the single network connection. In some embodiments, data flowing from the guest system can be encapsulated or otherwise manipulated using the peripheral device. In order to secure data flowing from the host, the data packets can be manipulated in a number of different ways. For example, the packet headers can be filtered to prevent spoofing or other security issues. The packets also can be encapsulated with specific protocol headers, where the protocol itself can ensure the filtering. In other embodiments, the packet headers can be re-written, such as by adding bytes to the packet, with the header being marked as being re-written and in a different state. Changing aspects of traffic, such as by filtering packet headers, can help to prevent spoofing over the in-band data channel as well. The special PCI attributes also enable access of all ranges of memory on the host, among other such locations.

In some embodiments, a trusted peripheral can be used to create logical PCI connections for multiple servers, which can be connected to the respective host through a PCI switch or other such mechanism. To create the connections, the peripheral can represent itself as a logical PCI card to each of the servers, rather than being physically connected to the PCI bus of each of the individual servers. In various embodiments, a server can have multiple cores that enable the utilization of multiple virtual functions, which can be used to implement a set of virtual trusted peripherals. In some embodiments, an SR-IOV network adapter can be used to provide at least some of these virtual functions. The virtual trusted peripherals can be exposed to the cores of the server, and mapped to the physical hardware (i.e., sitting on top of the physical hardware).

Figure 4:
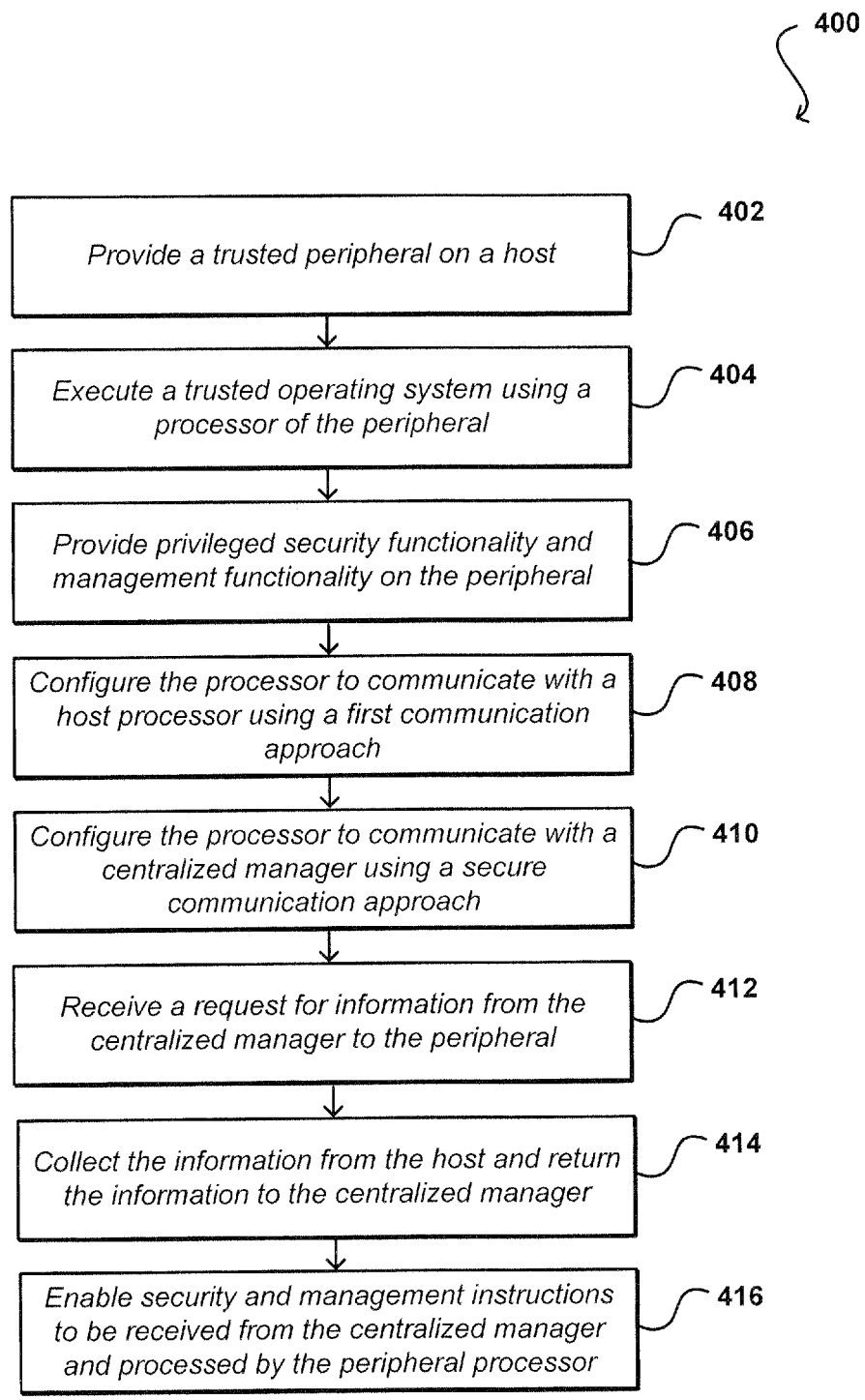
FIG. 4 illustrates an example of a process for securely providing security and management functionality from a host that can be used in accordance with one embodiment.

FIG. 4 illustrates an example process 400 for providing security and management functions using a trusted peripheral device that can be utilized in accordance with various embodiments. It should be understood that, for any process discussed herein, there can be additional, fewer, or alternative steps performed in similar or alternative orders, or in parallel, within the scope of the various embodiments unless otherwise specifically stated. In this example, a trusted peripheral is provided 402 on a host device. As discussed, this can include a card, dongle, or other such device connected to a bus or other such component of a host device that can be provisioned to one or more users in an electronic environment. In some embodiments, this can also include a virtual peripheral device, among other such options. A trusted operating system can be caused 404 to be executed using a processor of the trusted peripheral, which functions as an independent controller. Privileged security and management functionality can be provided 406 via the peripheral. The processor of the peripheral can be configured 408 to communicate with the host, applications running on the host, or users having access to the host, for example, using a first communications approach, such as by sending conventional packets over a first channel. The processor can also be configured 410 to communicate with a centralized management service, host, or other such component using a second communications approach, such as by sending packets over a second, secure channel, which might utilize a second port or be multiplexed on the same port as the host traffic, or by adding special or secret information to the packets. A request can be received 412 from the centralized manager for information about the host machine. The processor of the peripheral device can be configured 414 to collect the information from the host and return that information to the centralized manager. Subsequently, at run time in this example, security and management instructions then can be enabled 416 to be received to the peripheral, where those instructions will be inaccessible to the host or other such entities or components.

Figure 5:
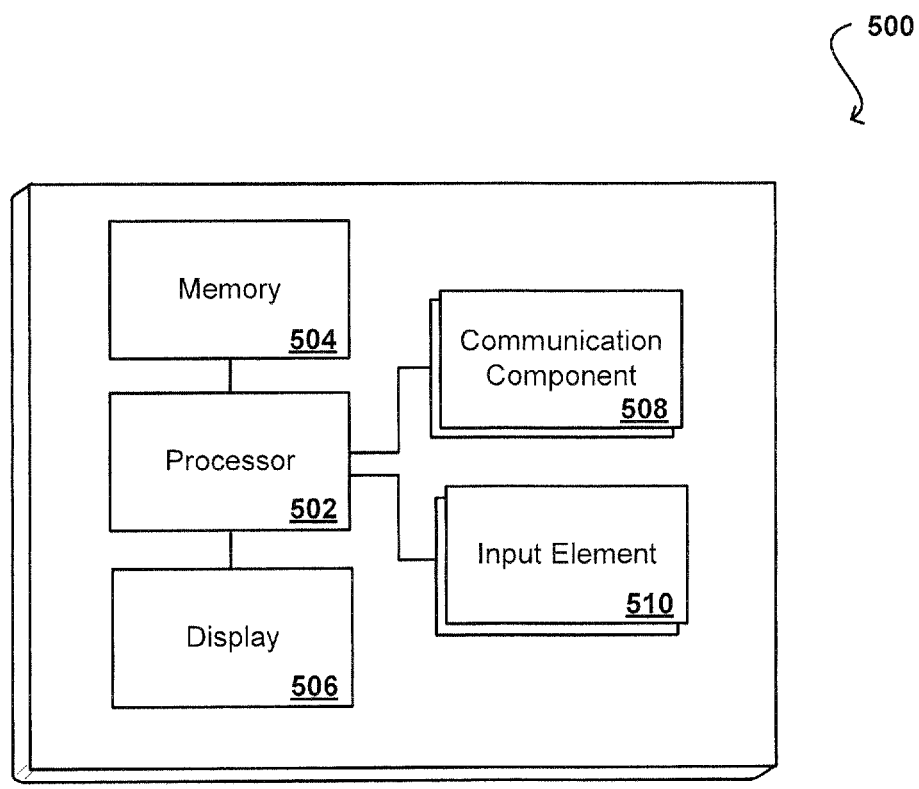
FIG. 5 illustrates a set of components of an example computing device that can be used in accordance with various embodiments.

FIG. 5 illustrates a logical arrangement of a set of general components of an example computing device 500 that can be utilized in accordance with various embodiments. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device may include some type of display element 506, such as a touch screen or liquid crystal display (LCD), although devices such as servers or portable media players might convey information via other known elements. In at least some embodiments, the computing device can include one or more networking and/or communication elements 508, such as a Wi-Fi, Bluetooth, RF, wired, or wireless communication system. The device in many embodiments can communicate with a network, such as the Internet, and may be able to communicate with other such devices. In some embodiments the device can include at least one additional input device 510 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from. Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A peripheral device, comprising:
a device body including at least one connector for connecting to a host machine, the connector providing a first communication channel enabling communication between the host machine and the peripheral device;
a processor connected to the device body and operable to receive communications from the host machine over the first communication channel;
a second communication channel enabling secure communications to a management entity of a shared resource environment including the host machine, the second communication channel being inaccessible to the host machine; and
memory including instructions for performing privileged security functionality and management functionality, the memory further including instructions that, when executed by the processor of the peripheral device, enable the peripheral device to:
receive, from the management entity and over the second communication channel, a management instruction relating to at least one of the security or the management functionality, the management instruction relating to the security functionality including instructions to perform at least one of providing platform management functionality, passing boot measurement to the management entity, attesting platform measurement for software running on the host, securely sealing platform secrets, or performing memory forensics;
utilize the instructions stored on the peripheral device in order to execute the management instruction; and
send, to the management entity and over the second communication channel, information resulting from the executing of the management instruction, wherein the information resulting from the executing of the management instruction is inaccessible to the host machine.

2. The peripheral device of claim 1, wherein the second communication channel utilizes a secure and authenticated network connection inaccessible via the first communication channel.

3. The peripheral device of claim 1, further comprising:
a power connection enabling the processor to receive power independent of power being provided to a host processor of the host machine, the power connection enabling the processor of the peripheral device to perform security and management functions independent of a state of the host processor.

4. The peripheral device of claim 1, wherein the first communication channel and the second communication channel are multiplexed onto the same physical connection.

5. The peripheral device of claim 1, wherein the information resulting from the executing of the management instruction is secured by at least one of filtering packet headers for the information, encapsulating packets for the information, or rewriting the packets to add one or more bytes to each packet.

6. The peripheral device of claim 1, wherein the instructions when executed further enable the peripheral device to utilize a specially encoded bus cycles when communicating the information, wherein the peripheral device is operable to act as a trusted peripheral device performing privileged operations, and wherein a malicious peripheral device is unable to spoof traffic from the trusted peripheral device.

7. The peripheral device of claim 1, wherein the instructions when executed further enable the peripheral device to utilize a special interconnect encoding for packets used to transmit the information, wherein the packets are able to be designated as higher priority traffic than for packets without the special encoding.

8. A method of performing secure operations on a host, comprising:
provisioning a peripheral device, connected to the host, with at least one key or secret enabling the peripheral device to communicate securely with a management entity;
receiving, from the management entity and over a secure communications channel, an instruction relating to at least one of privileged security functionality or management functionality, the instruction relating to the privileged security functionality including instructions to perform at least one of providing platform management functionality, passing boot measurement to the management entity, attesting platform measurement for software running on the host, securely sealing platform secrets, or performing memory forensics, the secure communications channel being isolated from a communications channel between the peripheral device and a central processor of the host;
processing the instruction using a dedicated processor of the peripheral device; and
sending, to the management entity and over the secure communications channel, information resulting from the processing of the instruction, wherein the information and the dedicated processor are inaccessible to the central processor of the host, and wherein the information is encrypted using the at least one key or secret.

9. The method of claim 8, further comprising:
using multiplexing on a single connection, or two separate connections to the peripheral device, to provide the secure communications channel and the communications channel between the peripheral device and the central processor of the host.

10. The method of claim 8, further comprising:
securing data sent to the management entity over the secure communications channel using at least one of packet header filtering, packet encapsulation, additional special interconnect marking, or byte addition to packet headers.

11. The method of claim 8, further comprising:
using an out-of-band (OOB) networking stack to provide the secure communications channel, wherein the peripheral device is operable to receive the instructions independent of a power state of the central processor of the host and the host is unable to intercept the instructions.

12. The method of claim 8, further comprising:
causing at least a portion of the processing of the instructions to be performed using the central processor of the host, under instruction of the dedicated processor.

13. The method of claim 8, further comprising:
executing a trusted operating system on the peripheral device to assist in processing the instruction, the operating system providing at least two modes of operation including a privileged security mode and a management mode.

14. The method of claim 8, further comprising:
validating authorization information using the at least one key or secret before processing the instruction.

15. The method of claim 8, wherein the instructions associated with the management functionality include instructions to perform at least one of reading host memory locations, performing boot measurement, accessing hardware registers in the central processor, reading device sensors, performing power and thermal management, performing hardware integrity checks, collecting statistics on the host, or applying code patches.

16. The method of claim 8, wherein the peripheral device is one of a network interface card or dongle connected to the host machine, or a virtual peripheral device operating on top of a processor core.

17. The method of claim 8, wherein processing the instruction includes utilizing information stored in at least one of a pair of privileged modes of operation, the pair including a security mode and a management mode.

18. The method of claim 8, wherein the security functionality has a higher privilege level than the management functionality.

19. A non-transitory computer-readable storage medium storing instructions that, when executed by a processor of a peripheral device connected to a host machine, cause the peripheral device to:
receive an instruction over a secure communications channel to the peripheral device, the instructions being received from a management entity and relating to at least one of privileged security functionality or management functionality, the instructions relating to the privileged security functionality including instructions to perform at least one of providing platform management functionality, passing boot measurement to the management entity, attesting platform measurement for software running on the host, securely sealing platform secrets, or performing memory forensics, the secure communications channel being isolated from a communications channel between the peripheral device and a central processor of the host;
process the instruction using code stored on the peripheral device, the code including code for performing a set of privileged security functions and a set of management functions; and
send, to the management entity and over the secure communications channel, information resulting from the processing of the instruction.

20. The non-transitory computer-readable storage medium of claim 19, wherein the instructions when executed further cause the host machine to:
use multiplexing on a single connection or two separate connections to the peripheral device to provide the secure communications channel and the communications channel between the peripheral device and the central processor of the host.

21. The non-transitory computer-readable storage medium of claim 19, wherein the instructions when executed further cause the host machine to:
secure data sent to the management entity over the secure communications channel using at least one of packet header filtering, packet encapsulation, additional special interconnect marking, or byte addition to packet headers.

22. The non-transitory computer-readable storage medium of claim 19, wherein the instructions when executed further cause the host machine to:
use an out-of-band (OOB) networking stack to provide the secure communications channel, wherein the peripheral device is operable to receive the instructions regardless of a power state of the central processor of the host and the host is unable to intercept the instructions.

23. The non-transitory computer-readable storage medium of claim 19, wherein the instructions associated with the management functionality include instructions to perform at least one of reading host memory locations, accessing hardware registers in the central processor, reading device sensors, performing power and thermal management, performing hardware integrity checks, performing boot measurement, collecting statistics on the host, or applying code patches.

* * * * *